United States Patent
Rankin

(10) Patent No.: US 11,372,773 B2
(45) Date of Patent: Jun. 28, 2022

(54) SUPPORTING A VIRTUAL MEMORY AREA AT A REMOTE COMPUTING MACHINE

(71) Applicant: John Rankin, Williamsport, OH (US)

(72) Inventor: John Rankin, Williamsport, OH (US)

(73) Assignee: Rankin Labs, LLC, Williamsport, OH (US)

( * ) Notice: Subject to any disclaimer, the term of this patent is extended or adjusted under 35 U.S.C. 154(b) by 98 days.

(21) Appl. No.: 16/885,706

(22) Filed: May 28, 2020

(65) Prior Publication Data

US 2020/0379916 A1    Dec. 3, 2020

Related U.S. Application Data

(60) Provisional application No. 62/853,288, filed on May 28, 2019.

(51) Int. Cl.
*G06F 12/1009* (2016.01)
*G06F 9/455* (2018.01)

(52) U.S. Cl.
CPC ...... *G06F 12/1009* (2013.01); *G06F 9/45558* (2013.01); *G06F 2009/45583* (2013.01); *G06F 2212/657* (2013.01)

(58) Field of Classification Search
CPC ............. G06F 12/1009; G06F 9/45558; G06F 2009/45583; G06F 2212/657; G06F 15/17331
See application file for complete search history.

(56) References Cited

U.S. PATENT DOCUMENTS

| | | |
|---|---|---|
| 3,688,090 A | 8/1972 | Rankin |
| 4,493,027 A | 1/1985 | Katz et al. |
| 5,522,045 A | 5/1996 | Sandberg |
| 5,829,041 A | 10/1998 | Okamoto et al. |
| 5,897,664 A | 4/1999 | Nesheim et al. |
| 5,918,229 A | 6/1999 | Davis et al. |
| 6,023,724 A | 2/2000 | Bhatia et al. |
| 6,243,789 B1 * | 6/2001 | Hasbun ............... G06F 12/0292 711/103 |
| 6,567,416 B1 | 5/2003 | Chuah |
| 6,714,985 B1 | 3/2004 | Malagrino et al. |
| 6,757,248 B1 | 6/2004 | Li et al. |

(Continued)

OTHER PUBLICATIONS

Information Sciences Institute, University of Southern California, RFC 791, Internet Protocol, DARPA Internet Program Protocol Specification, Sep. 1981.

(Continued)

*Primary Examiner* — Sean D Rossiter
(74) *Attorney, Agent, or Firm* — Standley Law Group LLP; Jeffrey S. Standley; Adam J. Smith

(57) ABSTRACT

Systems and methods for operating a virtual memory area are provided. A dynamic address translation table for the virtual memory area is generated. A program is operated at a first computing machine until insufficient local real memory is available to complete operation. A request for real memory space is transmitted from the first computing machine to an additional computing machine. A location of a segment of the local real memory of the additional computing machine is received at the first computing machine and the dynamic address translation table is updated to associate a virtual address with the received location.

16 Claims, 4 Drawing Sheets

(56) References Cited

U.S. PATENT DOCUMENTS

| | | |
|---|---|---|
| 7,103,025 B1 | 9/2006 | Choksi |
| 7,409,525 B1 | 8/2008 | Clark et al. |
| 7,702,743 B1 | 4/2010 | Wong |
| 8,090,866 B1 | 1/2012 | Bashyam et al. |
| 8,374,091 B2 | 2/2013 | Chiang |
| 8,397,151 B2 | 3/2013 | Salgado et al. |
| 9,350,663 B2 | 5/2016 | Rankin |
| 10,860,228 B1* | 12/2020 | Mulani ............... G06F 3/0604 |
| 2001/0017844 A1 | 8/2001 | Mangin |
| 2001/0019614 A1 | 9/2001 | Madoukh |
| 2002/0041592 A1 | 4/2002 | Van Der Zee et al. |
| 2002/0054570 A1 | 5/2002 | Takeda |
| 2002/0071436 A1 | 6/2002 | Border et al. |
| 2003/0031198 A1 | 2/2003 | Currivan et al. |
| 2003/0065688 A1* | 4/2003 | Dageville ......... G06F 16/24561 |
| 2004/0044872 A1 | 3/2004 | Scott |
| 2005/0105506 A1 | 5/2005 | Birdwell et al. |
| 2005/0286517 A1 | 12/2005 | Babbar et al. |
| 2006/0002681 A1 | 1/2006 | Spilo et al. |
| 2006/0034317 A1 | 2/2006 | Hong et al. |
| 2006/0133364 A1 | 6/2006 | Venkatsubra |
| 2006/0259587 A1 | 11/2006 | Ackerman et al. |
| 2006/0265554 A1 | 11/2006 | Carter et al. |
| 2007/0025388 A1 | 2/2007 | Abhishek et al. |
| 2007/0028121 A1 | 2/2007 | Hsieh |
| 2007/0112714 A1 | 5/2007 | Fairweather |
| 2007/0180041 A1 | 8/2007 | Suzuoki |
| 2007/0223395 A1 | 9/2007 | Lee et al. |
| 2007/0283125 A1 | 12/2007 | Manczak et al. |
| 2008/0086620 A1 | 4/2008 | Morris |
| 2008/0104313 A1 | 5/2008 | Chu |
| 2009/0089537 A1 | 4/2009 | Vick et al. |
| 2009/0204763 A1 | 8/2009 | Shum et al. |
| 2010/0049922 A1 | 2/2010 | Aronovich et al. |
| 2010/0103830 A1 | 4/2010 | Salgado et al. |
| 2010/0321397 A1 | 12/2010 | Ginzburg |
| 2011/0072234 A1 | 3/2011 | Chinya et al. |
| 2011/0149891 A1 | 6/2011 | Ramakrishna |
| 2011/0231630 A1 | 9/2011 | Dannowski et al. |
| 2011/0238793 A1 | 9/2011 | Bedare et al. |
| 2012/0289250 A1 | 11/2012 | Fix et al. |
| 2012/0300648 A1 | 11/2012 | Yang |
| 2012/0307678 A1 | 12/2012 | Gerber et al. |
| 2013/0028121 A1 | 1/2013 | Rajapakse |
| 2013/0058231 A1 | 3/2013 | Paddon et al. |
| 2013/0091102 A1 | 4/2013 | Nayak |
| 2014/0089585 A1* | 3/2014 | Nakajima ........... G06F 13/1663 711/118 |
| 2014/0095810 A1 | 4/2014 | Loewenstein et al. |
| 2014/0100014 A1 | 4/2014 | Bennett, III et al. |
| 2014/0254598 A1 | 9/2014 | Jha et al. |
| 2014/0280669 A1 | 9/2014 | Harper, III et al. |
| 2014/0294019 A1 | 10/2014 | Quan et al. |
| 2015/0100613 A1 | 4/2015 | Osiecki et al. |
| 2015/0134930 A1 | 5/2015 | Huang et al. |
| 2015/0229714 A1 | 8/2015 | Venkatsubra et al. |
| 2015/0370720 A1 | 12/2015 | Rowlands et al. |
| 2016/0077976 A1 | 3/2016 | Raikin et al. |
| 2016/0171399 A1 | 6/2016 | Santhanam et al. |
| 2016/0269294 A1 | 9/2016 | Rankin |
| 2016/0294983 A1 | 10/2016 | Kliteynik et al. |
| 2017/0010900 A1 | 1/2017 | Cobb |
| 2017/0054720 A1* | 2/2017 | Geng ................ H04L 67/1097 |
| 2017/0090872 A1 | 3/2017 | Mathew et al. |
| 2017/0235499 A1 | 8/2017 | Xu et al. |
| 2018/0018147 A1 | 1/2018 | Sugawara |
| 2018/0060244 A1 | 3/2018 | Godard et al. |
| 2018/0102975 A1 | 4/2018 | Rankin |
| 2018/0227264 A1 | 8/2018 | Krauss |
| 2018/0285262 A1 | 10/2018 | Trikalinou et al. |
| 2019/0266101 A1 | 8/2019 | Robinson et al. |
| 2020/0019410 A1* | 1/2020 | Dima ...................... G06F 9/54 |
| 2020/0183854 A1 | 6/2020 | Johns et al. |
| 2020/0233668 A1 | 7/2020 | Rankin |
| 2020/0236026 A1 | 7/2020 | Rankin |
| 2020/0264970 A1* | 8/2020 | Lee ...................... G06F 9/5016 |
| 2020/0310993 A1 | 10/2020 | Kumar et al. |
| 2020/0334168 A1 | 10/2020 | Rankin |

OTHER PUBLICATIONS

Postel, J., RFC 792, Internet Control Message Protocol, DARPA Internet Program Protocol Specification, Sep. 1981.

Information Sciences Institute, University of Southern California, RFC 793, Transmission Control Protocol, DARPA Internet Program Protocol Specification, Sep. 1981.

McCann, J. et al., RFC 1981, Path MTU Discovery for IP version 6, Aug. 1996.

Mathis, M. et al., TCP Selective Acknowledgment Options, Oct. 1996.

Montenegro, G. et al., RFC 4944, Transmission of IPv6 Packets over IEEE 802.15.4 Networks, Sep. 2007.

Paxson et al., RFC 2330, Framework for IP Performance Metrics, May 1998.

Thubert, P. et al., LLN Fragment Forwarding and Recovery draft-thubert-6lo-forwarding-fragments-02, Nov. 25, 2014.

Li, T. et al., A New MAC Scheme for Very High-Speed WLANs, Proceedings of the 2006 International Symposium on a World of Wireless, Mobile and Multimedia Networks, 2006.

Rabah, K., Steganography—The Art of Hiding Data, Information Technology Journal, 2004, pp. 245-269.

\* cited by examiner

SUPPORTING A VIRTUAL MEMORY AREA AT A REMOTE COMPUTING MACHINE

CROSS-REFERENCE TO RELATED APPLICATIONS

This application claims the benefit of U.S. Provisional Patent Application Ser. No. 62/853,288 filed May 28, 2019, the disclosures of which are hereby incorporated by reference as if fully restated herein.

TECHNICAL FIELD

Exemplary embodiments relate generally to systems and methods for supporting virtual memory areas at remote computing machines.

BACKGROUND AND SUMMARY OF THE INVENTION

Computing machines that are designed to be used for general purpose computing needs generally have hardware configured to take advantage of the concept of virtual storage. Virtual memory has been in use since at least the 1960s and has allowed computing machines to overcome the limitations imposed by the space, size, and cost of real memory. Early computers were limited to executing and operating upon data that could completely fit within the memory storage that was available within a given machine. This storage area was often referred to as "real memory", as it actually existed within the physical machine; however, this limitation significantly influenced the effectiveness of the computing machines and put additional limitations on the types of software programs that could be developed. To resolve this issue, hardware providers created a concept now often referred to as "virtual storage". Virtual storage allows a software program to utilize more, and often far more, memory than is actually in existence within the machine. This is accomplished by mapping virtual to real addresses and taking advantage of the fact that not all memory is truly needed at all times, and therefore, sections of memory can be paged out or temporarily transferred to disk storage and returned to memory only when needed.

The fundamental idea behind virtual storage is the ability to appear to utilize far more memory space than is actually available. This is made possible because certain locations within memory are used less often than others. The concept is similar to reserves in banking, where the bank holds only the cash that is expected to be used rather than the entire aggregate that might be held in trust. It is unlikely that all customers will ask for all their money, all at the same time. Therefore, the bank needs to only have on hand what the bank reasonably expects will be requested during a given time period.

This internal hardware control over virtual storage is accomplished using two major controls. First, a translation table is maintained to facilitate mapping virtual addresses to real addresses. As an instruction is executed by the hardware processor, all addresses necessary for the machine instruction to be completed are resolved. This resolution process involves looking up the virtual address within the translation table and dynamically converting the virtual address to the corresponding real address. Once all addresses have been translated, the instruction can be executed and the illusion of the larger virtual area is complete.

Second, when the dynamic address translation process fails to produce a valid real address for use, an interruption of the normal machine program execution occurs. Control is passed to the machine's operating system and gives the operating system the opportunity to manipulate memory. The operating system either assigns an available free piece of real memory that is added to the translation table, or swaps out a piece of lesser used real memory to make room for a piece of storage previously moved to long term storage. The dynamic translation table is updated and the interrupted program is resumed to permit the instruction execution to complete its normal operation.

Since the internal hardware of the computing machine is designed to allow for the use of virtual memory, these machines provide a wide range of support for multiple virtual memory areas within the machine. Therefore, a single operating program can have access to more than one virtual area at a time, or different programs within the machine can be assigned specific virtual memory areas for their operation.

The two major controls over virtual storage operation are tightly connected to both the hardware and the operating system of the given machine. The dynamic address translation table is managed by the operating system, along with the interruption method for switching between real memory usage and physical long-term storage. What is needed is a virtual memory system and method that is not tightly connected to the hardware of the computing machine or the operating system.

The present disclosures provide systems and methods where the internal dynamic address translation of a computing machine may be intercepted to permit programming processes to utilize virtual storage that exists outside of the computing machine's direct control. This may be accomplished by interfacing with the operating system of a computing machine and inserting a new communication process between the process interruption and the dynamic address translation. Rather than utilize only resources directly connected with the computing machine, the disclosed system and method may provide a virtual storage space located at, or shared with, another machine using a network connection. A local real memory and a local dynamic address translation table may serve to support the virtual storage located on a remote machine.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
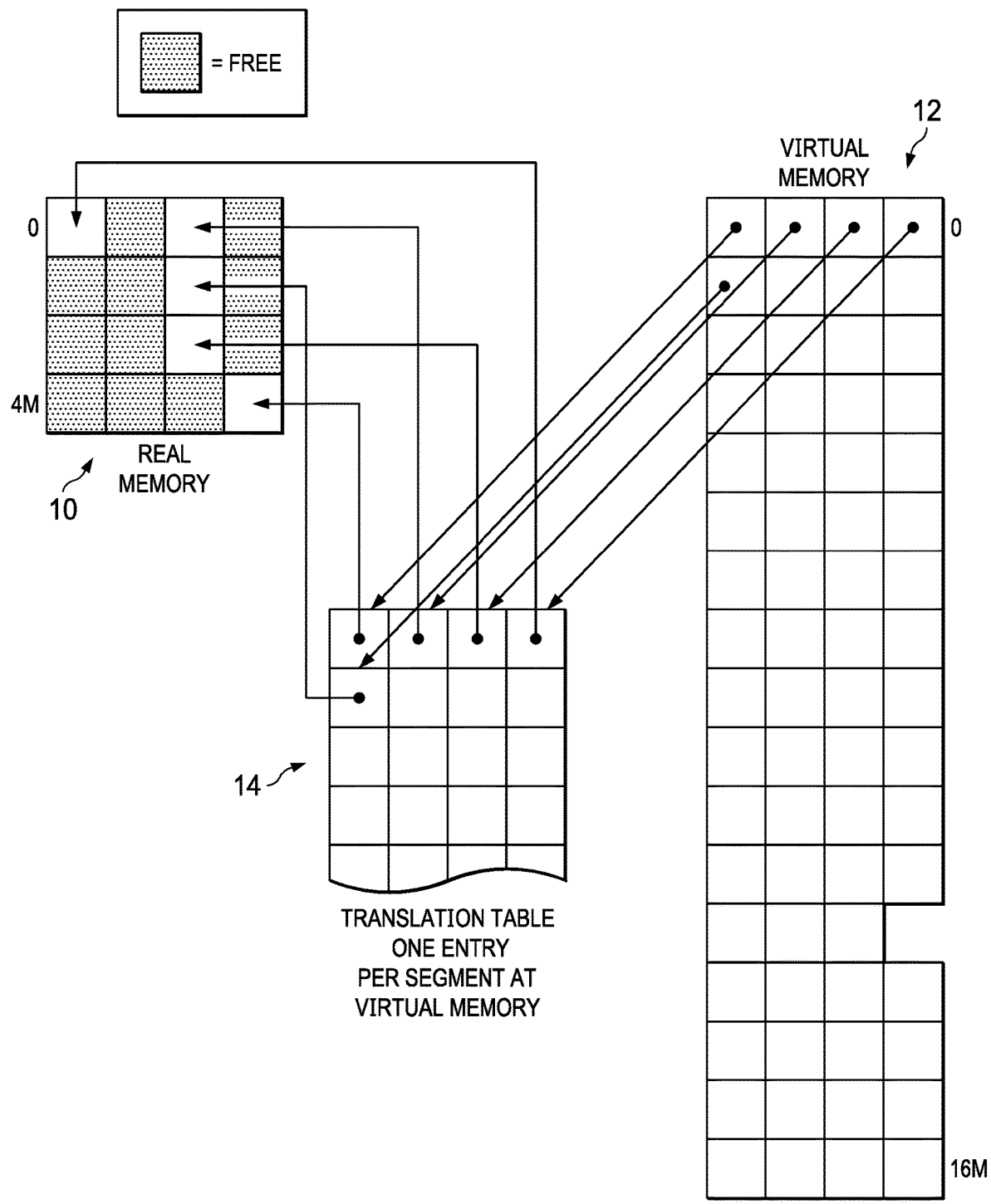
FIG. 1 is a simplified diagram of a traditional virtual memory system.

The traditional use of virtual memory is illustrated in FIG. 1. In the illustrated example, 4M of real memory 10 is used to support and create 16M of virtual memory 12. When access to a piece of real memory 10 is required by a program 16, an address for the portion of real memory 10 corresponding with a portion of requested virtual memory 12 is retrieved from a translation table 14. The translation table 14 provides an entry for every segment of the virtual memory 12. By looking up the virtual memory address, the corresponding real memory address that is used to hold the data may be substituted by a computing machine. If the virtual memory 12 is not supported by an equivalent piece of real memory 10, the translation table 14 is updated. This updating process might require the temporary transfer of data to a more permanent location, like a computer disk or direct access storage device (DASD).

Figure 2:
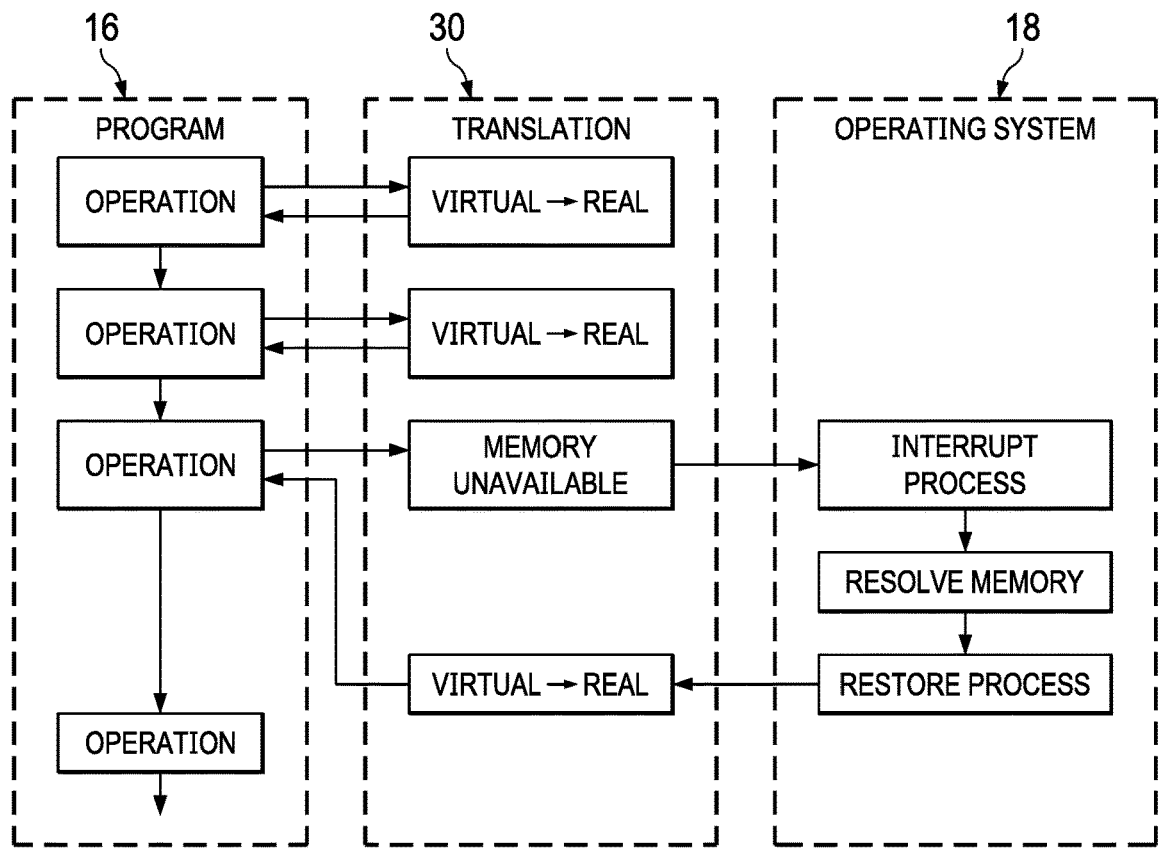
FIG. 2 is a simplified flow diagram for executing a program while using virtual memory.

FIG. 2 is a simplified diagram illustrating a traditional process for executing a program 16 using virtual memory 12. As an exemplary illustration of how the traditional virtual memory system operates, the process is described with regards to an "add" operation. The "add" instruction may take a number stored in memory and mathematically add it to a register within the computing machine. This instruction may utilize virtual storage 12 and real memory 10 in two ways. First, the instruction itself may be located in virtual memory 12 and may be locatable by its virtual memory address. Second, the number to be added to the register may likewise be located in virtual memory 12 and may be separately locatable by its virtual memory address. These two virtual memory addresses are translated into their respective corresponding real memory addresses to determine where the instruction and data to be added is actually located in the real memory 10. This translation 30 may be performed by way of a translation table 14 stored at the hardware of the local machine. This translation 30 may be performed prior to the "add" operation executing. The translation 30 is performed prior to the instruction because the virtual memory 12 does not truly exist within the local machine. Instead, the virtual memory 12 is merely a convenient way of describing a contiguous area of storage that in reality is much larger than the local machine can actually contain in its local memory.

Each virtual address must undergo a translation to reveal its actual location within the real memory 10 that actually exists with the local machine. This translation is accomplished by the tightly coupled hardware through the use of the translation table 14. The local machine takes the virtual address and looks it up at the translation table 14 to determine the corresponding real address. Once the translation of both addresses is completed, the operation may be executed. At no time is a program 116 involved aware of this translation as the translation is performed by the hardware of the local machine without knowledge of the program 116 (i.e., the software).

However, if any of the requested virtual addresses do not have a valid representation within the translation table 14 the hardware must interrupt the instruction and pass control to an operating system 18 for the machine. Since this interruption occurs when insufficient real memory 10 exists to support the virtual image, the operating system 18 must resolve the problem. This resolution might involve connecting a free and available piece of real memory 10 or moving a previously stored piece of real memory 10 back from disk after making space available by storing a piece of real memory 10 that is no longer needed. Once the translation table 14 has been updated to reflect the now connected virtual to real relationship, the interrupted operation of the program 116 may be resumed. This process is highly confined and tightly coupled to the operation within the local hardware as well as the physical hardware of the local machine.

Figure 3:
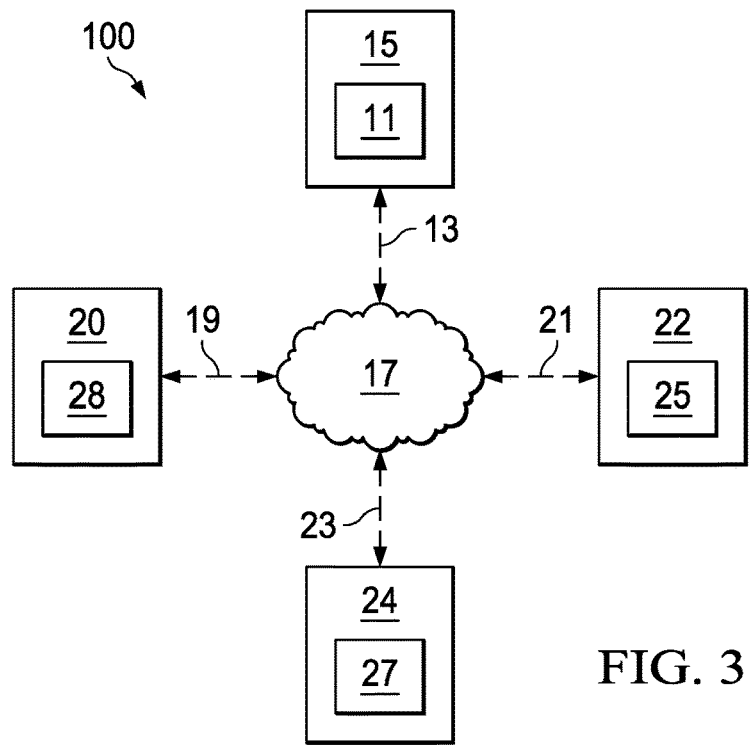
FIG. 3 is a simplified diagram of exemplary remote machines in accordance with the present invention.
Figure 4:
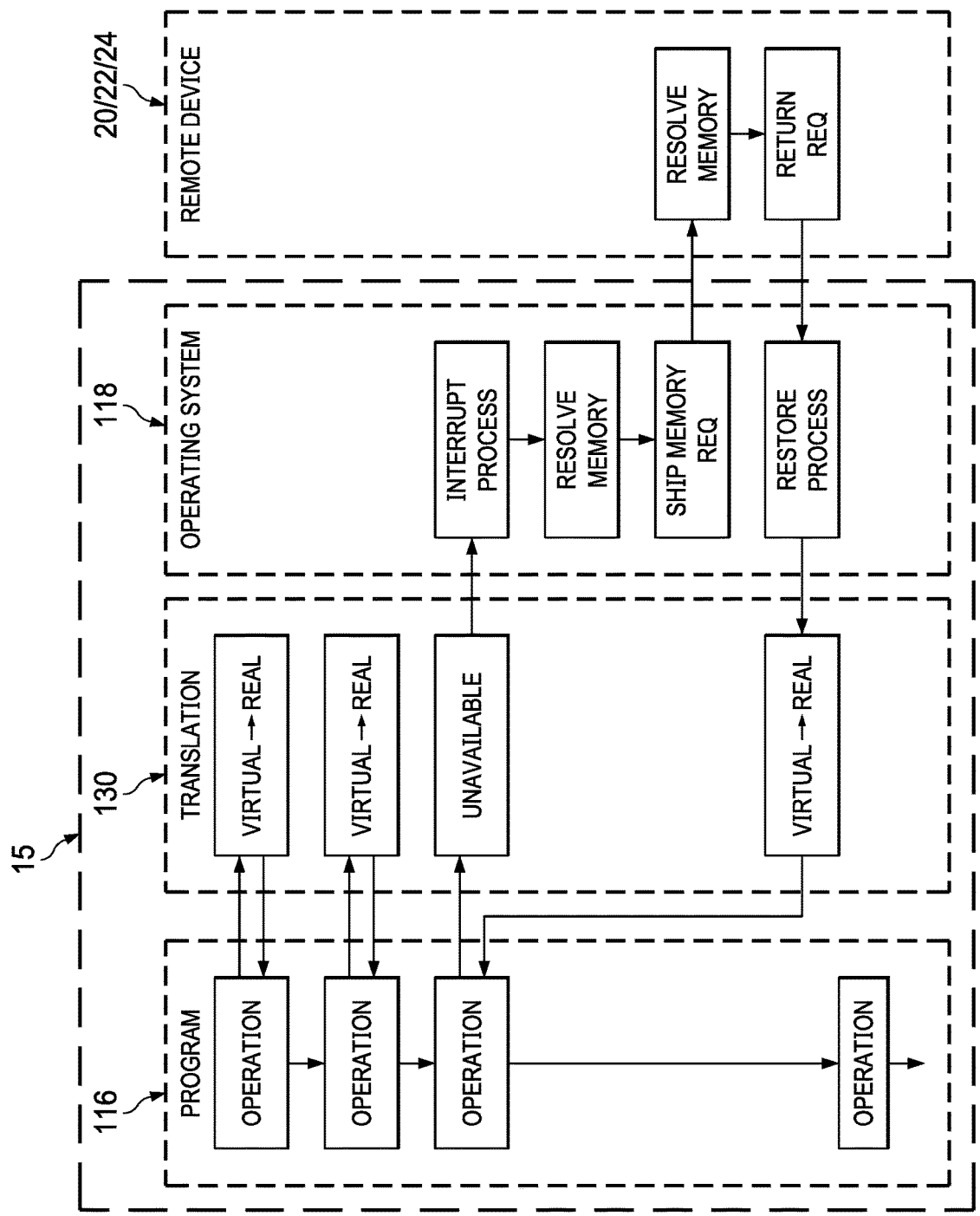
FIG. 4 is a simplified flow diagram for executing a program using virtual memory located at, or shared with, the remote machines of FIG. 3 in accordance with the present invention.

FIG. 3 is a simplified diagram of exemplary remote machines 100. FIG. 4 is a simplified flow diagram for executing a program while using virtual memory located at, or shared with, the remote machines 100. A local machine 15 may be in electronic communication with a remote machine 20. Such electronic communication may be made by way of an established communication pathway 19 between the local machine 15 and the remote machine 20. The communication pathway 19 may comprise any number of wired or wireless connections and various communication devices. The communication pathway 19 may comprise one or more networks 17 of the same or different type. The network 17 may be an internet, intranet, cellular network, the world wide web, LAN, some combination thereof, or the like. The local machine 15 may comprise a server, personal computer, tablet, smartphone, or other computing device. The remote machine 20 may comprise a server, personal computer, tablet, smartphone, or other computing device.

A dynamic address translation table 114 may be located at the remote machine 20. The dynamic address translation table 114 may be located at the real memory 28 of the remote machine 20. The local machine 15 may maintain a copy of the dynamic address translation table 114. The copy of the translation table 114 may be stored at the real memory 11 of the local machine 15. In exemplary embodiments, the local machine 15 may, from time to time, utilize its copy of the dynamic address translation table 114 when the program 116 requests data stored at a virtual memory area 112 to translate the requested virtual address to the corresponding real address. However, where the local machine 15 is unable to resolve a request for translation, the request may be transmitted to the remote machine 20 for resolution at the dynamic address translation table 114 stored at the remote machine 20. The remote machine 20 may transmit an address for its real memory 28 to the local machine 15. The local machine 15 may use the transmitted address for the local machine's image of the virtual memory area 112. The local machine 15 may update its copy of the translation table 114 accordingly.

The virtual memory area 112 may be contained entirely within the remote machine 20. In this way, a pseudo process is not necessarily required. Furthermore, implementation of the virtual to real translation may be made by way of the local machine 15.

In exemplary embodiments, the local machine 15 and/or the remote machine 20 may be in electronic communication with one or more additional member machines 22 and 24. Each of the additional member machines 22, 24 may have their own respective real memory 25, 27. The additional member machines 22 and 24 may each comprise a server, personal computer, tablet, smartphone, or other computing device. The electrical connection to the member machine 22 and 24 may be made by way of the same or a different network 17 along various established communication pathways 19, 21, and 23. Any number of additional member machines 22, 24 of any type may be utilized.

Figure 5:
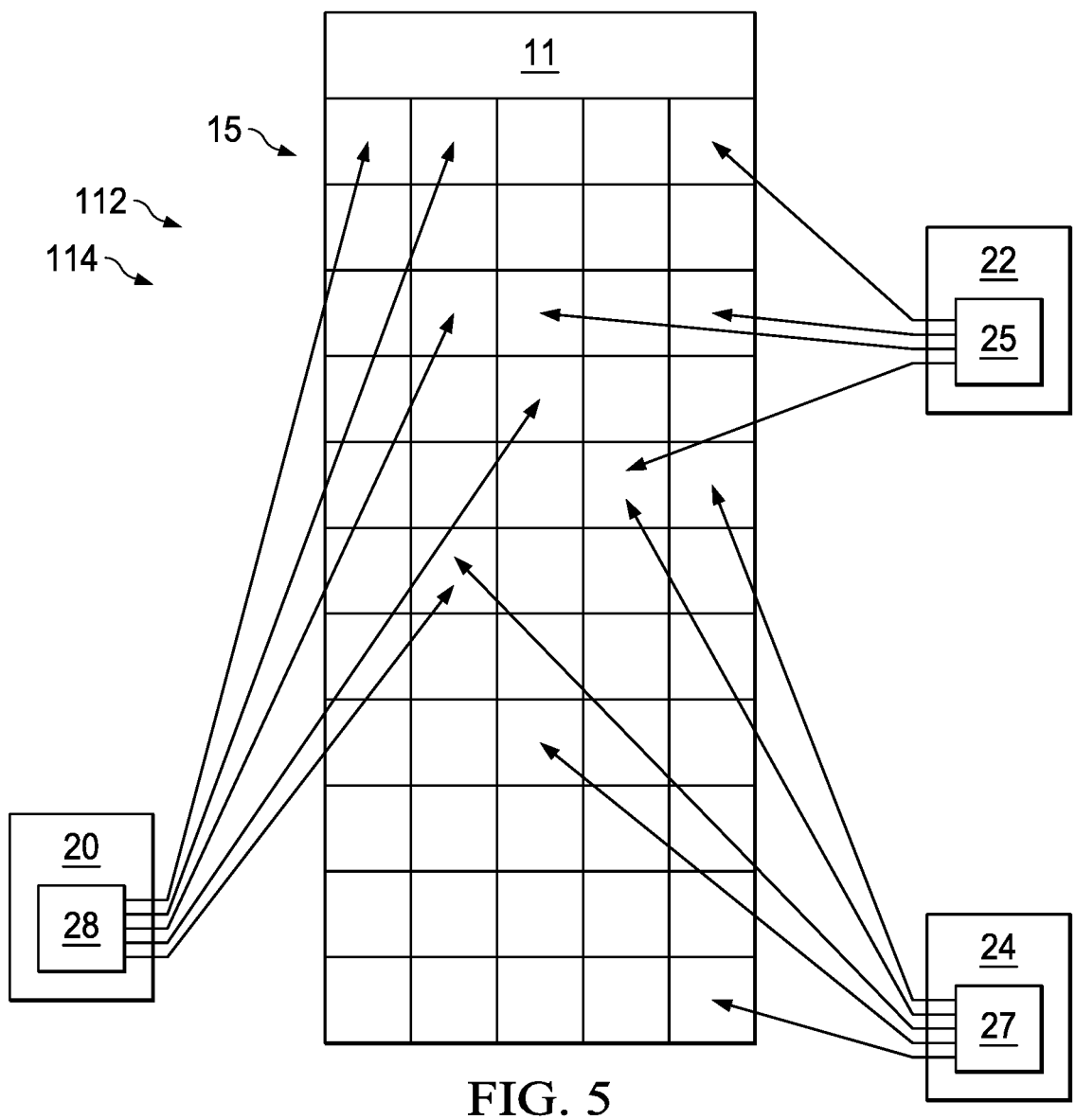
FIG. 5 is a diagram of an exemplary shared virtual area for use with the systems and processes of FIGS. 3-4 in accordance with the present invention.

FIG. 5 is a diagram of an exemplary shared virtual area 112. In exemplary embodiments, without limitation, the virtual memory area 112 may be shared among the additional member machines 22, 24. The virtual memory area 112 may be local to one machine 15 and remote to the other member machines 22, 24. In this way, the local machine 15 as well as the additional member machines 22, 24 may utilize the same virtual memory area 112 such that the virtual memory area 112 may be pooled between the various member machines 15, 22, 24. The master copy of the translation table 114 may be located at the remote machine 20 such that requests for resolution of address issues may be resolved by the remote machine 20. Furthermore, the real memory 28 of the remote machine 20 may be copied and shared with the various member machines 15, 22, 24.

Turing back to an example regarding the "add" operation, an explanation is provided as to how this operation may be performed with the systems and methods of FIGS. 3-4. Of course, the "add" operation is merely exemplary, any type or kind of operation may be utilized in conjunction with any type or kind of program 116. When the virtual addresses for each of the required data segments are translated by the translation table 114, the resulting real address may point to a secondary or temporary container of the data. This is because the virtual space 112 being translated does not exist within the local machine 15 and may instead be a reference to a virtual memory area 112 which exists in the remote machine 20. A translation process 130, while managed by the hardware of the local machine 15, does not make reference to a tightly coupled virtual to real relationship.

When the dynamic translation process 130 reaches a point where the dynamic address translation table 114 indicates an invalid relationship, the memory resolution process performed by the operating system 118 may become more complex. Rather than dealing with local real memory 11 and local memory (e.g., disk) storage of the local machine 15, the operating system 118 may transmit its request for real memory to the remote machine 20. The remote machine 20 may perform the dynamic virtual to real address translation 130 by way of the translation table 114 located at the remote machine 20. The remote machine 20 may isolate an appropriate portion of the real memory 28 of the remote machine 20 and transmit a copy of this real memory 28 segment to the local machine 15. After the local machine 15 receives a copy of the remote real memory 28, the local machine 15 may populate an appropriate portion of its real memory 10 in a way that matches the remote real memory 28 segment. The local machine 15 may update its copy of the dynamic address translation table 114. The operation may resume its execution and utilize the remote real memory 28 in a virtual capacity as if it were local to the local machine 15. In this way, a local program 116 may operate upon data that exists in the remote machine 20. Furthermore, this operation may be transparent to the program 116. While hardware of the local machine 15 may be used for the translation 130, the virtual storage area 112 may be provided by the remote machine 20.

In exemplary embodiments, the same or a similar process may be utilized with respect to the other member machine 22 and 24. The translation table 114 may be stored at one of the machines 15, 22, 24, another remotely located, but electronically connected computing machine, some combination thereof, or the like.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, and the like configured to perform the operations described herein. The electronic devices may be general purpose computers or specialized computing devices. The electronic devices may be personal computers, smartphones, tablets, databases, servers, or the like. The electronic connections described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A method for operating a virtual memory area shared between multiple, remotely located computing machines, said method comprising the steps of:
    providing a number of computing machines, wherein each of said number of computing machines are located remote from one another, wherein each of said number of computing machines are in electronic communication with one another by way of one or more networks, and wherein each of said number of computing machines comprise local real memory;
    generating a dynamic address translation table for the virtual memory area;
    operating a program at a first one of the number of computing machines ("the first computing machine") requiring memory space;
    determining, at the first computing machine, that insufficient space is available at the local real memory of the first computing machine to complete operation of the program;

transmitting a request for real memory space from the first computing machine to at least one other one of the number of computing machines ("the additional computing machine");

receiving, at the first computing machine from the additional computing machine, a location of a segment of the local real memory of the additional computing machine;

updating the dynamic address translation table to associate a virtual address with the received location;

receiving, at the first computing machine, a request for real memory space from the additional computing machine;

transmitting, from the first computing machine to the additional computing machines, a location of a segment of the local real memory of the first computing machine; and updating the dynamic address translation table to associate the transmitted location with a second virtual address.

2. The method of claim 1 further comprising the steps of:
resuming operation of the program.

3. The method of claim 2 wherein:
the request for real memory space transmitted from the first computing machine to the additional computing machine defines an amount of memory required to complete operation of the program; and
the segment of the local real memory of the additional computing machine is at least as large as the amount of memory required to complete operation of the program.

4. The method of claim 3 wherein:
operation of the program is halted until the dynamic address translation table is updated to associate the received location with the virtual address associated with the request for real memory space transmitted from the first computing machine to the additional computing machine.

5. The method of claim 1 wherein:
the dynamic address translation table is stored at the first computing machine.

6. The method of claim 1 wherein:
at least one of the number of computing machines comprises a personal computer.

7. The method of claim 1 wherein:
at least one of the number of computing machines comprises a server.

8. The method of claim 1 wherein:
at least one of the number of computing machines comprises a tablet.

9. The method of claim 1 wherein:
said one or more networks comprise IP protocol networks.

10. A method for operating a virtual memory area shared between multiple, remote computing machines, said method comprising the steps of:

establishing a connection between a local computing machine and a remote computing machine;

operating a first program at the local computing machine;

defining a remote virtual memory area for use by at least both of the local computing machine and the remote computing machine;

creating, at the local computing machine, a local dynamic address translation table to manage a local image of the remote virtual memory area;

transmitting a request for real memory from the local computing machine to the remote computing machine;

resolving virtual to real memory addresses at the remote computing machine by way of a remote dynamic address translation table stored at the remote computing machine for managing a local image of the remote virtual memory area and selection of an appropriate piece of real memory of the remote computing machine that satisfies the request for real memory received from the local computing machine;

transmitting a copy of the appropriate piece of real memory of the remote computing machine to the local computing machine;

updating the local dynamic address translation table at the local computing machine to allow the use of the transmitted copy of the appropriate piece of real memory received from the remote computing machine;

restoring operation of the program at the local computing machine;

operating a second program at the remote computing machine;

transmitting a request for real memory from the remote computing machine to the local computing machine;

resolving virtual to real memory addresses at the local computing machine by way of the remote dynamic address translation table stored at the local computing machine and selection of an appropriate piece of real memory of the local computing machine that satisfies the request for real memory received from the remote computing machine;

transmitting a copy of the appropriate piece of real memory of the local computing machine to the remote computing machine;

updating the remote dynamic address translation table at the remote computing machine to allow the use of the transmitted copy of the appropriate piece of real memory received from the local computing machine; and restoring operation of the second program at the remote computing machine.

11. The method of claim 10, further comprising the steps of:
establishing additional connections between the local computing machine and additional remote computing machines, wherein each of said additional remote computing machines are configured to generate a respective dynamic address translation table to manage a local image of the remote virtual memory area.

12. The method of claim 11, further comprising the steps of:
synchronizing the local dynamic address translation table, each of the respective dynamic address tables, and the remote dynamic address translation table on an ongoing basis.

13. A system for operating a virtual memory area comprising:

a first computing machine comprising local memory;

a second computing machine located remote from the first computing machine and comprising local memory, wherein the second computing machine is in electronic communication with the first computing machine by way of a network;

a common dynamic address translation table for a first virtual memory area for the first computing machine and a second virtual memory area for the second computing machine;

software instructions stored at the local memory of the first computing machine, which when executed, configures the first computing machine to:

operate a program until a determination is made that insufficient space is available at the local memory of the first computing machine to complete operations of the program;

transmit a request to the second computing machine for a segment of the local memory of the second computing machine at least as large as an amount of memory required to complete operation of the program;

receive a location of a segment of the local memory of the second computing machine; and update the common dynamic address translation table by associating the received location with a first virtual address;

software instructions stored at the local memory of the second computing machine, which when executed, configures the second computing machine to:

operate a second program until a determination is made that insufficient space is available at the local memory of the second computing machine to complete operations of the program;

transmit a request to the first computing machine for a segment of the local memory of the first computing machine at least as large as an amount of memory required to complete operation of the second program;

receive a location of a segment of the local memory of the first computing machine; and update the common dynamic address translation table by associating the received location with a second virtual address.

14. The system of claim 13 further comprising:

additional software instructions stored at the local memory of the first computing machine, which when executed, configures the first computing machine to:

pause operations of the program until the common dynamic address translation table is updated with the first virtual address; and resuming operations of the program after the common dynamic address translation table is updated with the first virtual address;

additional software instructions stored at the local memory of the second computing machine, which when executed, configures the second computing machine to:

pause operations of the second program until the common dynamic address translation table is updated with the second virtual address; and resuming operations of the second program after the common dynamic address translation table is updated with the second virtual address.

15. The system of claim 13 wherein:

the network is a packet switched network.

16. The system of claim 15 further comprising:

a number of additional computing machines, each comprising local real memory comprising a respective local copy of the common dynamic address translation table, wherein each of said number of additional computing devices are located remote from said first and second computing devices and are connected to said first and second computing devices by way of said network, and wherein said first computing machine, said second computing machine, and each of said additional computing machines are configured to synchronize their respective local copies of the common dynamic address translation table in at least an occasional basis.

\* \* \* \* \*